(12) United States Patent
Tsukazaki et al.

(10) Patent No.: US 11,396,276 B2
(45) Date of Patent: Jul. 26, 2022

(54) GAS EJECTION APPARATUS

(71) Applicant: DENSO TEN Limited, Kobe (JP)

(72) Inventors: Mitsuhiro Tsukazaki, Kobe (JP); Toru Yamaguchi, Kobe (JP); Minoru Hirashima, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/181,530

(22) Filed: Nov. 6, 2018

(65) Prior Publication Data

US 2019/0143946 A1    May 16, 2019

(30) Foreign Application Priority Data

Nov. 14, 2017  (JP) .............................. JP2017-219512

(51) Int. Cl.
| | | |
|---|---|---|
| *B60S 1/54* | (2006.01) | |
| *G02B 27/00* | (2006.01) | |
| *B60S 1/56* | (2006.01) | |
| *B08B 5/02* | (2006.01) | |

(52) U.S. Cl.
CPC ...... *B60S 1/54* (2013.01); *B08B 5/02* (2013.01); *B60S 1/56* (2013.01); *G02B 27/0006* (2013.01)

(58) Field of Classification Search
CPC ......... B08B 5/02; B25J 13/006; B25J 19/005; B25J 19/021; B25J 5/00; B25J 9/1664; B60S 1/54; B60S 1/56; B60S 1/0848; G02B 27/0006; G05D 1/0246; G05D 1/0274; G05D 2201/0207; G05D 2201/0216; G06F 3/0488; G06Q 10/08; G06Q 30/0601; G06Q 30/0617; G06T 1/0014; Y10S 901/01; H04N 5/2171; H04N 5/22521

USPC ................ 134/18, 37; 239/284.2; 15/318.1, 15/250.001; 34/523, 524

See application file for complete search history.

(56) References Cited

U.S. PATENT DOCUMENTS

| | | | | |
|---|---|---|---|---|
| 4,817,648 A * | 4/1989 | Sugasawa | ............... | B60S 1/603 134/57 R |
| 5,708,859 A * | 1/1998 | Tajima | ............... | G02B 27/0006 396/25 |
| 9,108,596 B2 * | 8/2015 | Stratton | .................... | B60S 1/62 |
| 9,278,670 B2 * | 3/2016 | Hattori | .................. | G03B 17/08 |
| 9,539,988 B2 * | 1/2017 | Hsiao | .................. | H04N 5/2171 |
| 9,821,771 B2 * | 11/2017 | Shimizu | .................. | B60S 1/026 |
| 9,956,941 B2 * | 5/2018 | Kiyohara | ............. | H04N 5/2171 |
| 10,857,980 B2 * | 12/2020 | Rice | ......................... | B60S 1/52 |

(Continued)

FOREIGN PATENT DOCUMENTS

| | | |
|---|---|---|
| JP | 2007-045187 A | 2/2007 |
| JP | 2009-220719 A | 10/2009 |

(Continued)

*Primary Examiner* — Duy Vu N Deo
*Assistant Examiner* — Christopher Remavege
(74) *Attorney, Agent, or Firm* — Oliff PLC

(57) ABSTRACT

A gas ejection apparatus ejects gas by use of a compressor that compresses the gas, and the gas ejection apparatus includes a detector and a microcomputer. The detector detects a signal relating to an ejection target device. The microcomputer controls the compressor to change a number of times of ejection of the gas in accordance with an amount of time elapsing between a detection of the signal by the detector and a next detection of the signal by the detector.

4 Claims, 8 Drawing Sheets

(56) References Cited

U.S. PATENT DOCUMENTS

| | | | | |
|---|---|---|---|---|
| 2002/0005440 | A1* | 1/2002 | Holt | B60S 1/54 239/284.2 |
| 2003/0155001 | A1* | 8/2003 | Hoetzer | B60S 1/0848 134/37 |
| 2011/0073142 | A1* | 3/2011 | Hattori | B60S 1/56 134/56 R |
| 2012/0117745 | A1* | 5/2012 | Hattori | B60S 1/54 15/250.01 |
| 2013/0092758 | A1* | 4/2013 | Tanaka | B60S 1/52 239/284.1 |
| 2014/0060582 | A1* | 3/2014 | Hartranft | G02B 27/0006 134/18 |
| 2014/0104426 | A1* | 4/2014 | Boegel | B60R 1/00 348/148 |
| 2014/0270379 | A1* | 9/2014 | Snider | B60R 1/00 382/104 |
| 2015/0032292 | A1* | 1/2015 | Stratton | B60S 1/62 701/2 |
| 2015/0145956 | A1* | 5/2015 | Hayakawa | G06K 9/00791 348/46 |
| 2015/0203077 | A1* | 7/2015 | Gokan | B60S 1/0848 134/36 |
| 2015/0277111 | A1* | 10/2015 | Bell | G03B 17/12 359/509 |
| 2015/0329083 | A1* | 11/2015 | Kiyohara | B60S 1/0848 348/148 |
| 2015/0353024 | A1* | 12/2015 | Cooper | B60R 11/04 348/148 |
| 2017/0313286 | A1* | 11/2017 | Galera | B60S 1/52 |
| 2017/0355353 | A1* | 12/2017 | Kato | B60S 1/481 |
| 2018/0354469 | A1* | 12/2018 | Krishnan | G01S 17/931 |
| 2019/0106085 | A1* | 4/2019 | Bacchus | B60S 1/56 |
| 2020/0180567 | A1* | 6/2020 | Sakai | B60S 1/528 |

FOREIGN PATENT DOCUMENTS

| | | |
|---|---|---|
| JP | 2013-006480 A | 1/2013 |
| JP | 2018-083499 A | 5/2018 |
| WO | 2014/010578 A1 | 1/2014 |
| WO | 2014/017626 A1 | 1/2014 |
| WO | 2015/198645 A1 | 12/2015 |
| WO | 2017/002877 A1 | 1/2017 |

* cited by examiner

GAS EJECTION APPARATUS

BACKGROUND OF THE INVENTION

Field of the Invention

The invention relates to a gas ejection apparatus and a gas ejection method.

Description of the Background Art

Conventionally, there has been a gas ejection apparatus that ejects gas compressed by a pump. The gas ejection apparatus ejects the gas, for example, to a lens of a camera mounted outside a vehicle to remove an object on the lens.

However, when a conventional technology is used, there is a case in which the gas is ejected more than a necessary number of times, which may cause abrasion of the gas ejection apparatus and/or may increase electricity consumption.

SUMMARY OF THE INVENTION

According to one aspect of the invention, a gas ejection apparatus that ejects gas by use of a compressor that compresses the gas includes: a detector that detects a signal relating to an ejection target device; and a microcomputer that controls the compressor to change a number of times of ejection of the gas in accordance with an amount of time elapsing between a detection of the signal by the detector and a next detection of the signal by the detector.

Thus, a proper number of times of gas ejection can be set.

According to another aspect of the invention, in a case where the amount of time elapsing is equal to or less than a predetermined time, the microcomputer controls the compressor, in response to the next detection of the signal, to eject the gas a number of times that is less than a previous number of times that the gas was injected in response to the detection of the signal before the next detection.

Thus, the controller prevents the unnecessary ejection of the gas by the compressor.

Therefore, an object of this invention is to provide a gas ejection apparatus and a gas ejection method for setting a proper number of times of gas ejection.

These and other objects, features, aspects and advantages of the invention will become more apparent from the following detailed description of the invention when taken in conjunction with the accompanying drawings.

DESCRIPTION OF THE EMBODIMENTS

A gas ejection apparatus and a gas ejection method of this embodiment will be described with reference to the attached drawings. This invention is not limited by the embodiment described below.

Figure 1:
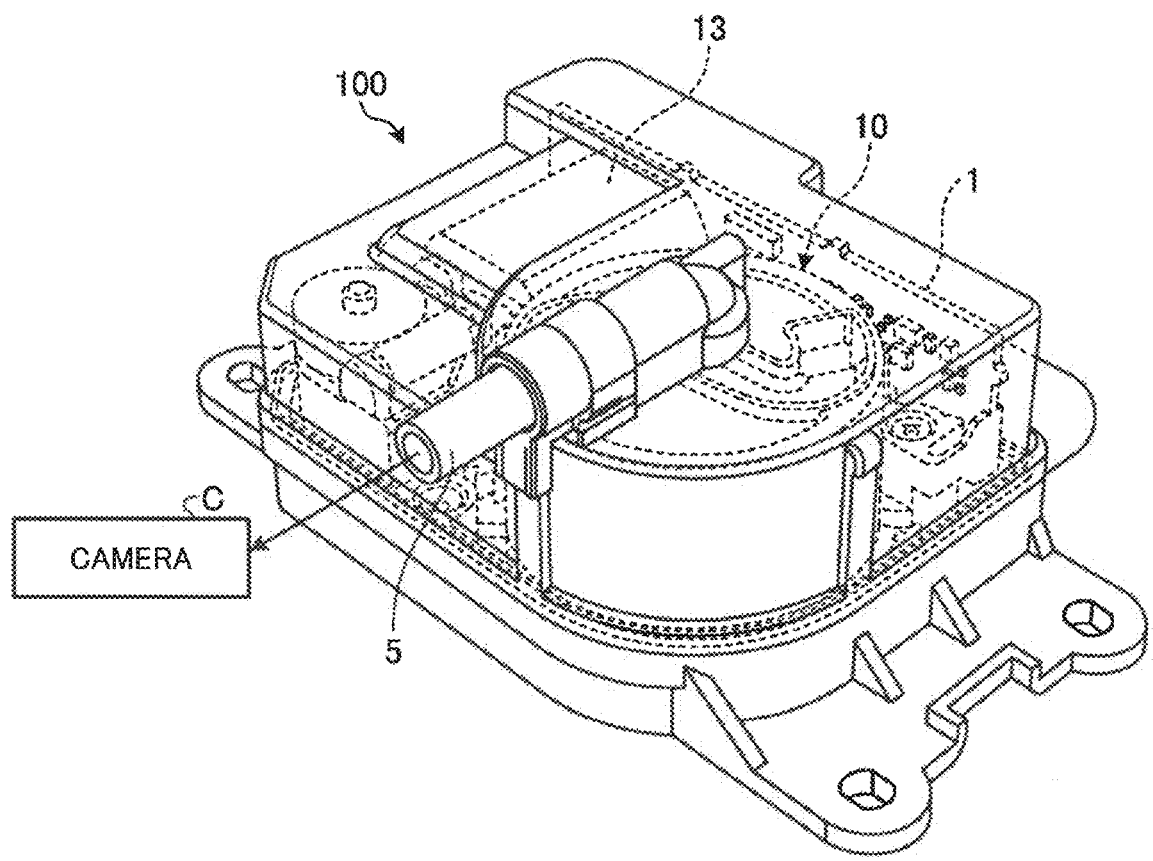
FIG. 1 is a perspective transparent view of a gas ejection apparatus.

First, an outline of the gas ejection apparatus of this embodiment will be described with reference to FIG. 1. FIG. 1 is a perspective transparent view of a gas ejection apparatus 100. A case will be described below in which the gas ejection apparatus 100 ejects gas onto a camera C to remove an object, such as a rain drop, on a lens of the camera C that is a gas ejection target device.

As shown in FIG. 1, the gas ejection apparatus 100 includes a controller 1, an output portion 5, a compressor 10 and a drive portion 13. The controller 1 is a microcomputer having a CPU, a memory and the like, and controls the drive portion 13 to cause the compressor 10 to operate. The controller 1 will be described later in detail with reference to FIG. 6.

The compressor 10 has a rotary gas compression mechanism. The compressor 10 operates in accordance with driving of the drive portion 13, described later, and compresses intake gas and ejects the gas onto the camera C from the output portion 5. The gas compression mechanism of the compressor 10 will be described later with reference to FIG. 2.

The drive portion 13 includes a drive source, such as a motor, and drives the compressor 10 according to control by the controller 1. In other words, the drive portion 13 functions as a power source of the compressor 10. The drive portion 13 will be described later in detail with reference to FIG. 3.

Figure 2:
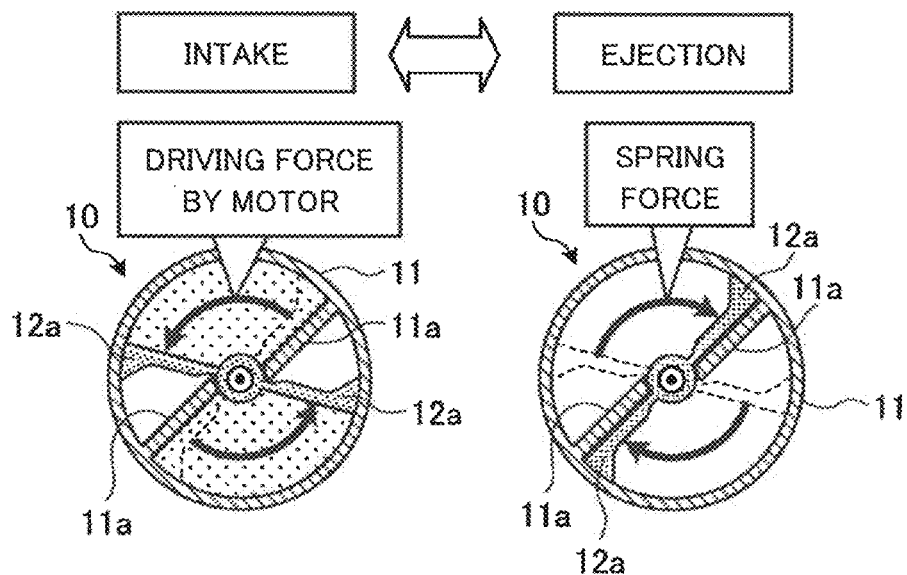
FIG. 2 illustrates operation of a compressor.
Figure 3:
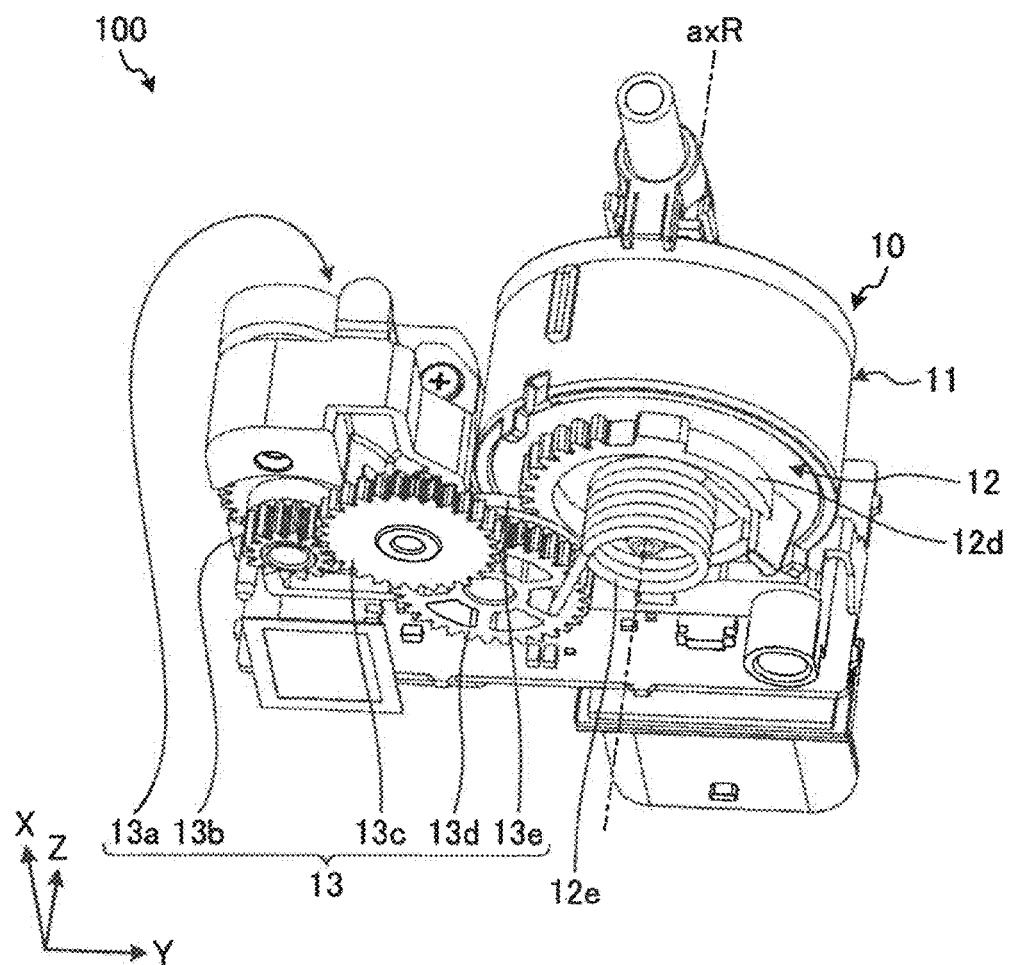
FIG. 3 illustrates operation of a drive portion.

Next, the compressor 10 and the drive portion 13 will be described with reference to FIG. 2 and FIG. 3. FIG. 2 illustrates operation of the compressor 10. FIG. 3 illustrates operation of the drive portion 13.

As shown in FIG. 2, the compressor 10 has a cylinder 11, a cylinder wall 11a and a rotating body 12a. The cylinder 11 is, for example, in a cylindrical shape, and has the cylinder wall 11a inside. The cylinder wall 11a separates a space inside the cylinder 11.

The rotating body 12a is formed in a flat plate shape, and rotates inside the cylinder 11. As shown in FIG. 2, for example, the rotating body 12a rotates in a direction in which the rotating body 12a moves away from the cylinder wall 11a (in a counterclockwise direction in the drawing) by a driving force of a motor 13a, described later. Thus, negative pressure is generated in a space between the cylinder wall 11a and the rotating body 12a, and the gas is drawn into the cylinder 11 from an intake hole (not illustrated).

When the rotating body 12a rotates and reaches a predetermined position, the driving force of the motor 13a is released. Then, the rotating body 12a free from the driving force of the motor 13a rotates in a direction that the rotating body 12a moves toward the cylinder wall 11a (in a clockwise direction in the drawing) by a spring force of a spring member 12e described later. Thus, the intake gas is compressed and ejected from the output portion 5 (see FIG. 1).

Next, the drive portion 13 will be described with reference to FIG. 3. As shown in FIG. 3, the drive portion 13 includes the motor 13a, a first gear 13b, a second gear 13c, a third gear 13d and a preceding gear 13e. The compressor 10 includes a rotating portion 12 in addition to the cylinder wall 11a described above.

The rotating portion 12 has a driven gear 12d and the spring member 12e. The foregoing rotating body 12a is provided to the rotating portion 12 inside the compressor 10. In other words, the rotating body 12a rotates in conjunction with the rotating portion 12 so that intake and ejection of the gas are performed by the compressor 10.

As described above, since the compressor 10 is a rotary compressor, it is possible that the compressor 10 saves space and is compact. Particularly, as described later, since the gas ejection apparatus 100 is installed in a limited space, such as a concave portion of a back door of a vehicle 50 (refer to FIG. 4), a space occupied by the gas ejection apparatus 100 needs to be smaller.

In a case where the compressor 10 compresses and ejects the gas by a reciprocation of a piston, when the compressor 10 takes in the gas, a shaft that interlocks with the piston comes out from an outer frame of the cylinder 11. Thus, a work area for the piston near the cylinder 11 needs to be secured. Thus, the occupied space increases.

The driven gear 12d is arranged so as to rotate coaxially with the rotating portion 12 about a rotating shaft axR. The rotating portion 12 is rotated by a rotary power that is applied to the driven gear 12d, and thus the foregoing rotating body 12a rotates. The spring member 12c is provided so as to bias the rotating portion 12 in a direction opposite to a direction in which the rotating portion 12 is rotated by the motor.

The motor 13a is, for example, an electric motor, and rotates and stops in accordance with ON/OFF control by the controller 1. A rotary driving force of the motor 13a is transmitted to the first gear 13b. The motor 13a may be a hydraulic motor or another power source may be used instead of the motor 13a.

The first gear 13b is connected to the second gear 13c. The second gear 13c is connected to the third gear 13d. The preceding gear 13e is coaxially arranged on the third gear 13d so as to be engaged with the driven gear 12d of the rotating portion 12. In other words, the rotary driving force by the motor 13a is transmitted to the rotating portion 12 via the first gear 13b, the second gear 13c, the third gear 13d and the preceding gear 13e.

As described above, the compressor 10 takes in the gas by the rotary driving force of the motor 13a, and ejects the gas by the spring force which biases the rotating portion 12 in a direction opposite to the direction in which the rotating portion 12 is rotated by the motor 13a to take the gas in. Therefore, although the motor 13a only rotates in one direction, the intake and rejection of the gas can be performed.

In other words, in the gas ejection apparatus 100, a rotational direction of the motor 13a is fixed, and the intake and ejection of the gas can be performed only by the ON/OFF control. If the intake and ejection of the gas are switched by clockwise and counterclockwise rotation of the motor 13a, complicated motor control may be required.

On the other hand, in this embodiment, although the rotational direction of the motor 13a is fixed in one direction, the intake and ejection of the gas can be achieved. Thus, the intake and ejection of the gas can be performed by simple control. A number of gears and a method of engagement of the gears from the motor 13a to the rotating portion 12 are not limited to examples shown in the drawings.

Next, an installation position of the gas ejection apparatus 100 will be described with reference to FIG. 4 and FIG. 5.

Figure 4:
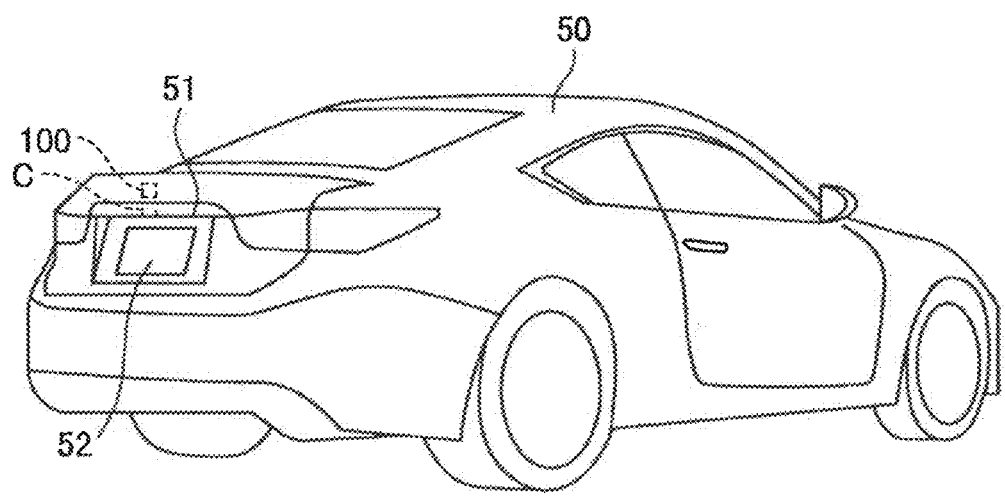
FIG. 4 illustrates an installation position of the gas ejection apparatus.

FIG. 4 illustrates the installation position of the gas ejection apparatus 100. FIG. 5 is an enlarged view of a vicinity of the camera C.

As shown in FIG. 4, the gas ejection apparatus 100 and the camera C are installed above a rear license plate 52 of the vehicle 50 in a substantial center in a left-right direction of the vehicle 50.

Figure 5:
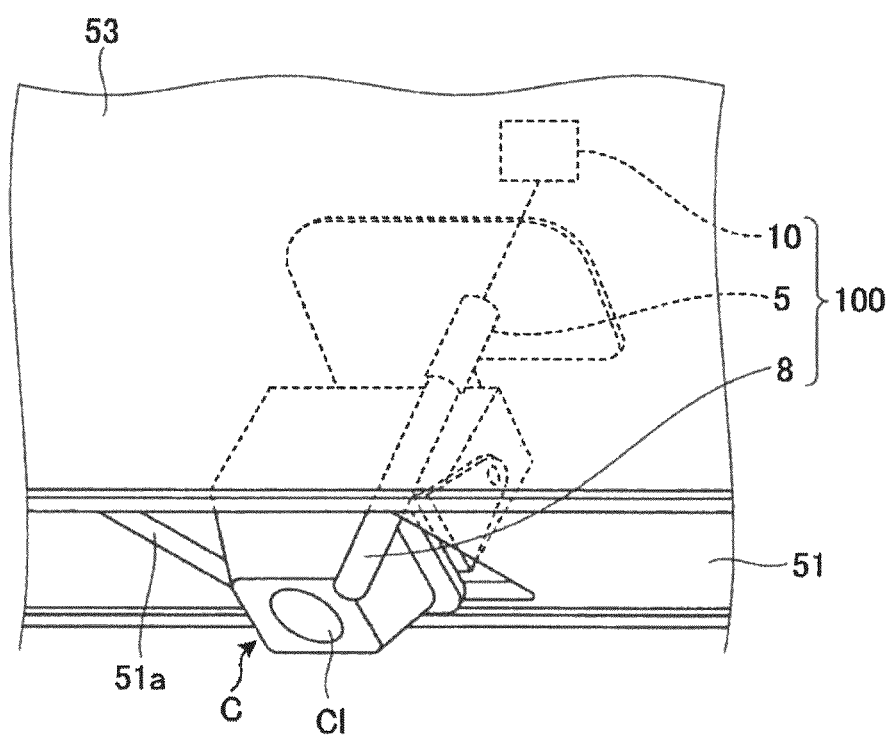
FIG. 5 is an enlarged view of a vicinity of a camera.

More specifically, as shown in FIG. 5, a garnish 51 is provided to a vehicle back panel 53, and the camera C is placed in a space between the vehicle back panel 53 and the garnish 51.

The camera C is placed so that a lens C1 of the camera C faces an outside from an aperture 51a provided to the garnish 51. The gas compressed by the compressor 10 of the gas ejection apparatus 100 is ejected from a nozzle 8 via the output portion 5, onto a center of the lens C1 of the camera C.

Here, as shown in FIG. 5, the nozzle 8 is placed above the lens C1 in a front view of the lens C1. In other words, the nozzle 8 is placed outside an image capturing range of the camera C. Thus, it is possible to prevent an event in which the nozzle 8 appears in an image captured by the camera C.

Figure 6:
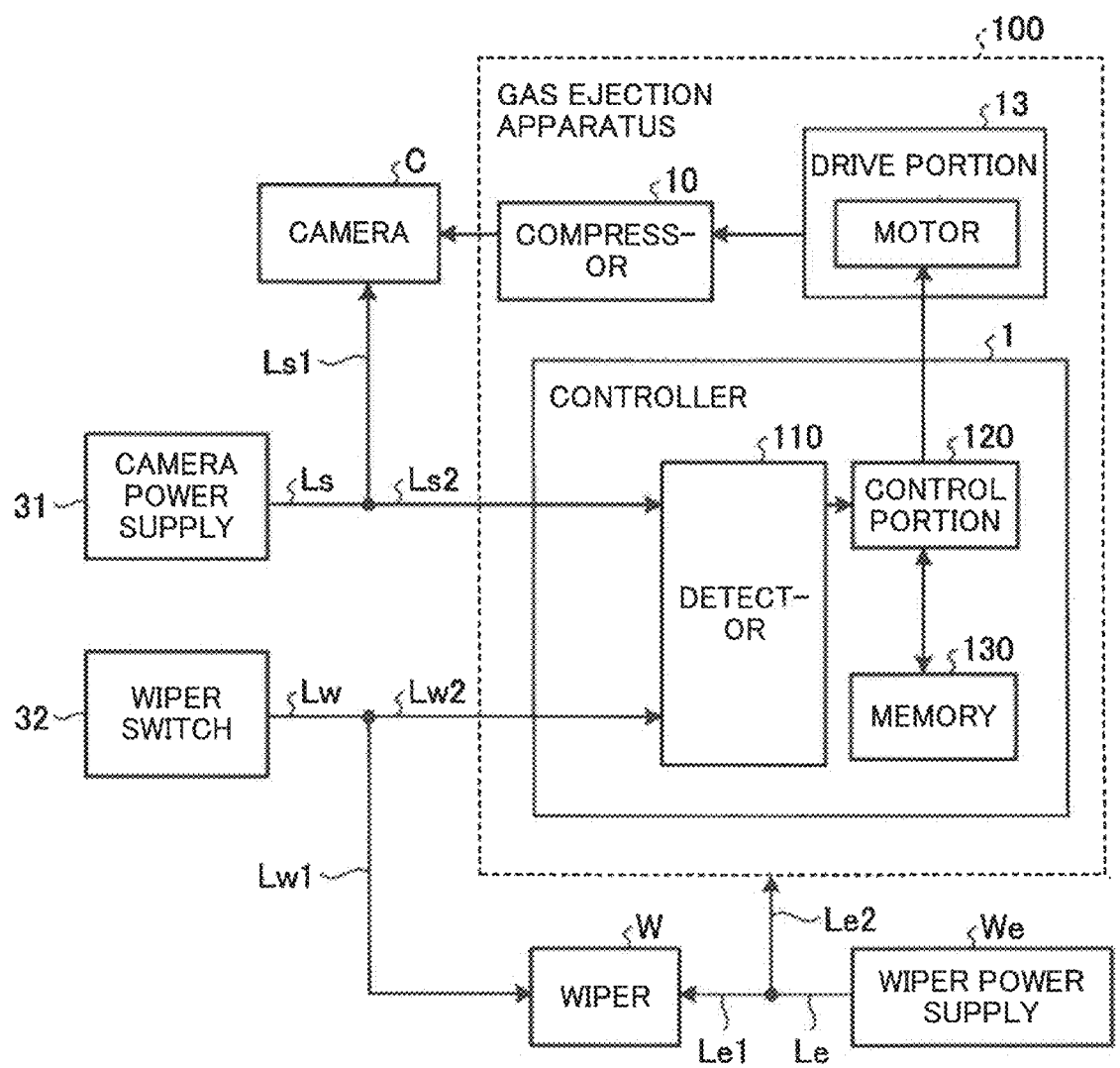
FIG. 6 is a block diagram of the gas ejection apparatus.

Next, a configuration example of the gas ejection apparatus 100 will be described with reference to FIG. 6. FIG. 6 is a block diagram of the gas ejection apparatus 100. FIG. 6 also shows the drive portion 13, the camera C, a camera power supply 31 and the like.

The camera C is, for example, a rear camera which is provided on a rear portion of the vehicle 50, as already described with reference to FIG. 4. The camera C is activated based on an activation signal which is supplied from the camera power supply 31, for example, when a shift lever of the vehicle 50 is moved to a reverse position.

When the shift lever is moved to the reverse position, a reverse signal is inputted to a display (not illustrated) of the vehicle 50. Thus, an output source of the display is switched from an AVN (Audio Visual Navigation (a registered trademark)), such as a navigation apparatus and an audio apparatus, to the camera C.

While the activation signal is being supplied, the camera C captures an image of an area behind the vehicle 50, and outputs the captured image to the display. Thus, a driver of the vehicle 50 can see the image of the area behind the vehicle 50 when the driver moves the vehicle 50 backward.

Power is supplied from a battery of the vehicle 50 to the camera power supply 31 in conjunction with an ACC (accessory) power supply of the vehicle 50. For example, when the ACC power is turned ON, the AVN of the vehicle 50 is activated, and the activation signal is inputted from the camera power supply 31 to the camera C. Then, an operation check of the camera C is performed.

At that time, the controller 1 detects that the ACC power of the vehicle 50 is turned ON by detecting the activation signal. In other words, the controller 1 detects, based on an initial activation signal, that the ACC power of the vehicle 50 is turned ON. Instead of the activation signal, a signal indicating that the ACC power is turned ON/OFF may be separately inputted to the controller 1.

A wiper switch 32 is for switching ON and OFF a wiper W of the vehicle 50. When the wiper switch 32 is turned ON by the driver, an operation signal that causes the wiper W to operate is outputted to the wiper W.

The wiper W, for example, receives the foregoing operation signal and performs a removing operation of a water drop and the like on a rear window. The wiper W is operated by power that is supplied from a wiper power supply We. For example, the wiper power supply We supplies power to the wiper W in conjunction with an ON state or an OFF state of an IG power of the vehicle 50.

Here, the gas ejection apparatus 100 is, for example, installed to the vehicle 50 as a dealer option product. Therefore, easy installation as well as versatility for various vehicles is required for the gas ejection apparatus 100.

Therefore, the gas ejection apparatus 100 operates by use of wires which are laid, during manufacturing of the vehicle 50, inside the back door to which the camera C is installed. In other words, there is no need for new wiring to install the gas ejection apparatus 100.

More specifically, the gas ejection apparatus 100 operates by use of power that is supplied from the wiper power supply We via a branched power supply line Le2 branched from a power supply wire Le. In other words, the gas ejection apparatus 100 is switched between ON and OFF in conjunction with the IG power supply. Another branched power supply line Le1 branched from the power supply wire Le is used to supply the power from the wiper power supply We to the wiper W.

The gas ejection apparatus 100 is connected to a branched camera wire Ls2 and a branched wiper wire Lw2 that are branched from a camera wire Ls and a wiper wire Lw, respectively. The camera wire Ls and the wiper wire Lw are provided inside the back door, and are connected from the camera power supply 31 and from the wiper switch 32, respectively. The gas ejection apparatus 100 ejects the gas when being triggered by a signal flowing in the branched camera wire Ls2 or the branched wiper wire Lw2.

A branched camera wire Ls1, another camera wire branched from the camera wire Ls, is used to transmit the activation signal from the camera power supply 31 to the camera C. A branched wiper wire Lw1, another wiper wire branched from the wiper wire Lw, is used to transmit the operation signal from the wiper switch 32 to the wiper W.

Here, the power supply wire Le, the camera wire Ls and the wiper wire Lw are laid inside the back door during the manufacturing of the vehicle 50. Therefore, each of the wires is branched and connected to the gas ejection apparatus 100 so that the gas ejection apparatus 100 is installed.

In other words, since the gas ejection apparatus 100 operates by use of the wires placed beforehand inside the back door, there is no need for new wiring. Thus, the gas ejection apparatus 100 can be easily installed and installation cost can be reduced.

The controller 1 includes a detector 110, a control portion 120 and a memory 130. The detector 110 detects the activation signal for the camera C that is the gas ejection target of the compressor 10. In this embodiment, the detector 110 detects the activation signal flowing in the branched camera wire Ls2.

The activation signal flows when the shift lever is in the reverse position, i.e., when the vehicle 50 moves backwards. The activation signal also flows when the AVN performs the operation check of the camera C after the ACC power is turned ON and the AVN is reactivated. In other words, the activation signal that flows first after the ACC power is turned ON flows besides when the shift lever is not in the reverse position.

The detector 110 detects the operation signal for the wiper W flowing in the branched wiper wire Lw2 when the wiper switch 32 is tuned ON. The detector 110 notifies the control portion 120 of the detected signal.

The control portion 120 controls a number of times of ejection (or number of ejection) by the compressor 10. More specifically, the control portion 120 controls the compressor 10 to change the number of times of ejection in accordance with an amount of time elapsing between a time point at which the activation signal is detected by the detector 110 and a time point at which a next activation signal is detected. The control portion 120 controls ejection of the gas performed by the compressor 10 by rotating the motor 13a of the drive portion 13.

Here, as described above, the activation signal flows when the shift lever is in the reverse position, i.e., when the vehicle 50 moves backwards. Therefore, the control portion 120 removes an object on the lens of the camera C by ejecting the gas from the compressor 10 based on the activation signal on a timing of activation of the camera C.

Thus, images captured after the object is removed can be supplied to the user. Since the control portion 120 removes the object on the lens of the camera C on the timing of the activation of the camera C, the user does not have to perform an additional operation, such as a switch operation.

The control portion 120 may also eject the gas from the compressor 10 based on the operation signal of the wiper W detected by the detector 110. Details of a process performed by the control portion 120 will be described later with reference to FIGS. 7 and 8.

The memory 130 is, for example, a volatile memory, and stores the number of times of ejection actually performed by the compressor 10. Moreover, since the memory 130 is the volatile memory, memory contents stored in the compressor 10 is erased when the power supply is stopped from the wiper power supply We.

As described above, the wiper power supply We supplies power to the wiper W and the gas ejection apparatus 100 in conjunction with the ON state or the OFF state of the IG power. Thus, when the IG power is changed to the ON state from the OFF state, a total number of times of ejection stored in the memory 130 is changed to zero (0).

In other words, in a case where the total number of times of ejection stored in the memory 130 is zero, the control portion 120 recognizes that the compressor 10 of the gas ejection apparatus 100 has not performed an ejection since the activation of the IG power.

Figure 7:
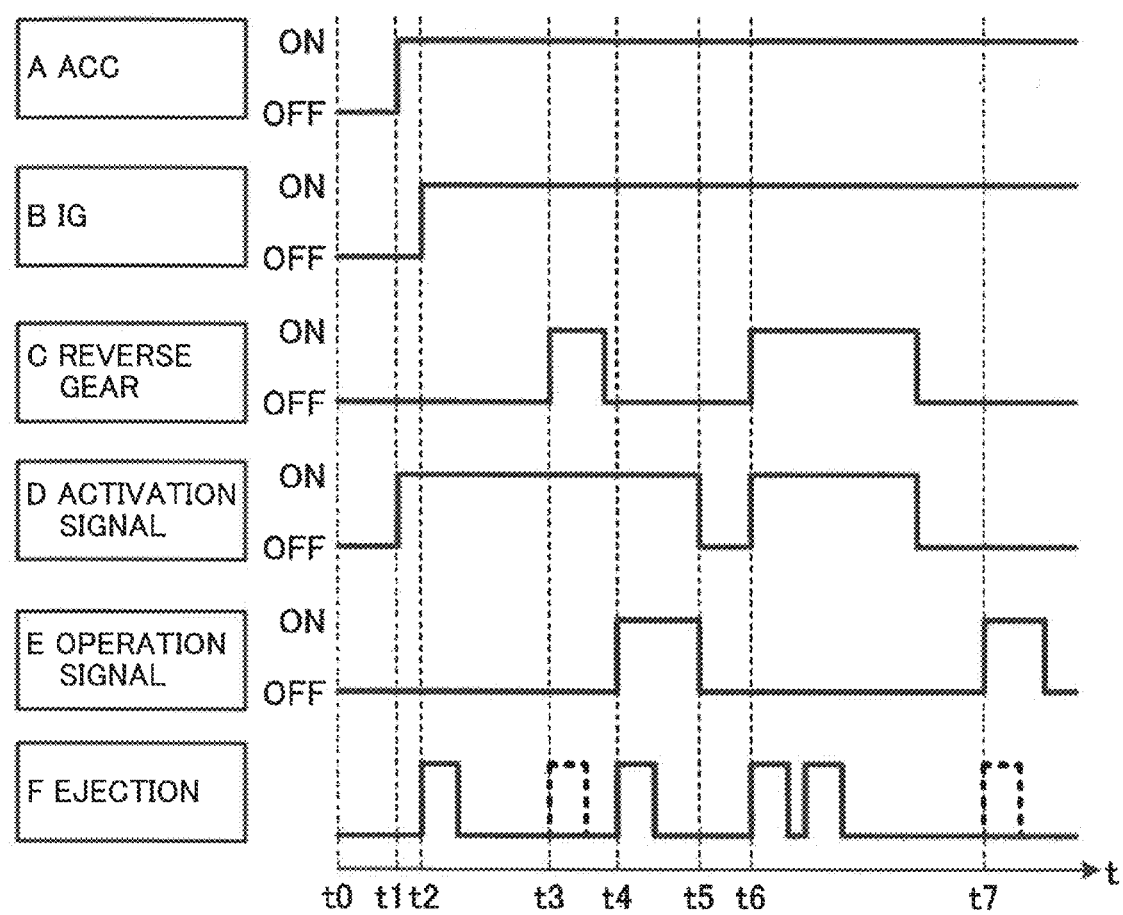
FIG. 7 illustrates a control process performed by a control portion.

Next described with reference to FIGS. 7 and 8 will be a control process performed by the control portion 120 for the compressor 10. FIG. 7 illustrates the control process performed by the control portion 120. A for the ACC power in FIG. 7 shows an ON state/an OFF state of the ACC power. B for the IG power in FIG. 7 shows the ON state or the OFF state of the IG power.

C for a reverse gear in FIG. 7 shows whether the shift lever is in the reverse position. D for the activation signal in FIG. 7 shows whether the activation signal is outputted from the camera power supply 31, and E for the operation signal in FIG. 7 shows whether the operation signal is outputted from the wiper switch 32.

Moreover, F for the ejection in FIG. 7 shows a number of times of ejection and a timing on which the compressor 10 ejects the gas. One rise shown in F in FIG. 7 shows one ejection.

As shown by A in FIG. 7, when the ACC power is turned ON (at a time point t1), the activation signal is also turned ON, as shown by D. As described above, the activation signal flows for a predetermined time period (from the time point t1 to a time point t5), to check operation of the camera C by the AVN when the AVN is activated.

After that, as shown by B in FIG. 7, when the IG power is turned ON (at a time point t2), the power starts to be supplied to the gas ejection apparatus 100 to activate the gas ejection apparatus 100.

At this time point, when the gas ejection apparatus 100 is activated, if the activation signal is ON, the control portion 120, as shown by D in FIG. 7, causes the compressor 10 to eject the gas a number of times for an initial ejection. In an example shown in FIG. 7, the number of times of ejecting the gas for the initial ejection is one. However, the number of times for the initial ejection is not limited to one, and may be two or more.

As described above, at the time point t2 at which the gas ejection apparatus 100 is activated, the total number of times of ejection stored in the memory 130 is zero. In a case where the control portion 120 detects the activation signal when the total number of times of ejection is zero, the control portion 120 sets the number of times of ejection to the number of times for the initial ejection.

Moreover, as described above, when the ACC power is turned ON, even in a case where the reverse gear is OFF, the activation signal is turned ON for the predetermined time period (from the time point t1 to the time point t5). Thus, as shown by C in FIG. 7, even if the reverse gear is turned ON (a time point t3) within the predetermined time period, the control portion 120 cannot detect the activation signal based on the change of the reverse gear to an ON state.

Thus, as shown by F in FIG. 7 by a broken line, even when the reverse gear is changed to the ON state at the time point t3, the gas is not ejected. In other words, within the predetermined time period after the ACC power is turned ON, the activation signal based on the change of the reverse gear to the ON state is deemed invalid. Thus, in a case where the activation signal is in the ON state when the control portion 120 is activated, the control portion 120 ejects the gas.

Accordingly, in the time period in which the activation signal based on the change of the reverse gear to the ON state is deemed invalid, even if the reverse gear is turned ON and an image captured by the camera C is displayed on the display, the image captured after the object is removed can be supplied to the user.

Moreover, in the time period in which the activation signal is deemed invalid, when the operation signal is turned ON (at a time point t4), as shown by E in FIG. 7, the control portion 120 causes the compressor 10 to eject the gas a predetermined number of times based on the operation signal.

The example illustrated in the drawing shows a case in which the predetermined number of times of ejection based on the operation signal is one (once). As described above, the operation signal is outputted based on a user operation with the wiper switch 32 (see FIG. 6).

Thus, in a case where the user desires to remove the object on the lens after the user sees the image captured by the camera C, the user can perform an additional removal operation with the wiper switch 32.

Then, as shown by D in FIG. 7, the activation signal is changed from the ON state to the OFF state at the time point t5. The control portion 120 detects, based on the change to the OFF state, that the operation check performed by the AVN for the camera C is completed.

As a result, the control portion 120 changes a mode of controlling the compressor 10 from initial control to normal control. Then, as shown by C in FIG. 7, when the reverse gear is changed to the ON state (at a time point t6), the activation signal is also turned ON, as shown by D in FIG. 7.

At this moment, the control portion 120 controls the compressor 10 to eject the gas the predetermined number of times based on the activation signal. An example illustrated in FIG. 7 shows that the predetermined number of times of ejection based on the activation signal is two (twice).

The gas is ejected at the time point t2 to remove an object on the camera C attached while the vehicle 50 is being parked. On the other hand, the gas is ejected at the time point t6 to remove an object on the camera C attached while the vehicle 50 is travelling.

While the vehicle 50 is travelling, dirt sometimes rolls as the vehicle 50 travels, so that the vehicle 50 gets an object on the lens of the camera C more frequently than while being parked. Thus, the control portion 120 causes the number of times of ejection based on the activation signal detected for a second time or later to be greater than the number of times of ejection based on the activation signal detected for a first time.

Therefore, the gas ejection apparatus 100 more surely removes the object on the lens of the camera C that the vehicle 50 has while being travelling. Moreover, as shown by E in FIG. 7, when the operation signal is tuned ON (at a time point t7) in the time period in which the activation signal is in the OFF state, the control portion 120 does not cause the gas to be ejected.

That is because the image captured by the camera C is not displayed on the display even if the gas is ejected while the camera C is not working. In other words, it is possible to prevent an unnecessary removal operation by validating only the detected operation signal during a time period in which the camera C is working.

In a case where the amount of time elapsing between a time point at which the signal relating to the camera C, the gas ejection target device, is detected and a time point at which a next activation signal is detected is equal to or less than a predetermined time, the control portion 120 controls the compressor 10 this time to eject the gas a number of times less than a previous number of times.

This point will be described with reference to FIG. 8. FIG. 8 illustrates a concrete example of a number of times of ejection with time. As shown by A in FIG. 8, there is a case in which after the ACC power is turned on, the ACC power is turned off during a time period (from a time point t2 to a time point t3) in which a starter motor that starts an engine of the vehicle 50 is activated.

During the time period, when remaining battery charge of the vehicle 50 is not enough, the power supply to the ACC from the battery is stopped. Once the engine is started, the starter motor is stopped and then the power supply to the ACC is resumed. Thus, the ACC is turned on again.

Figure 8:
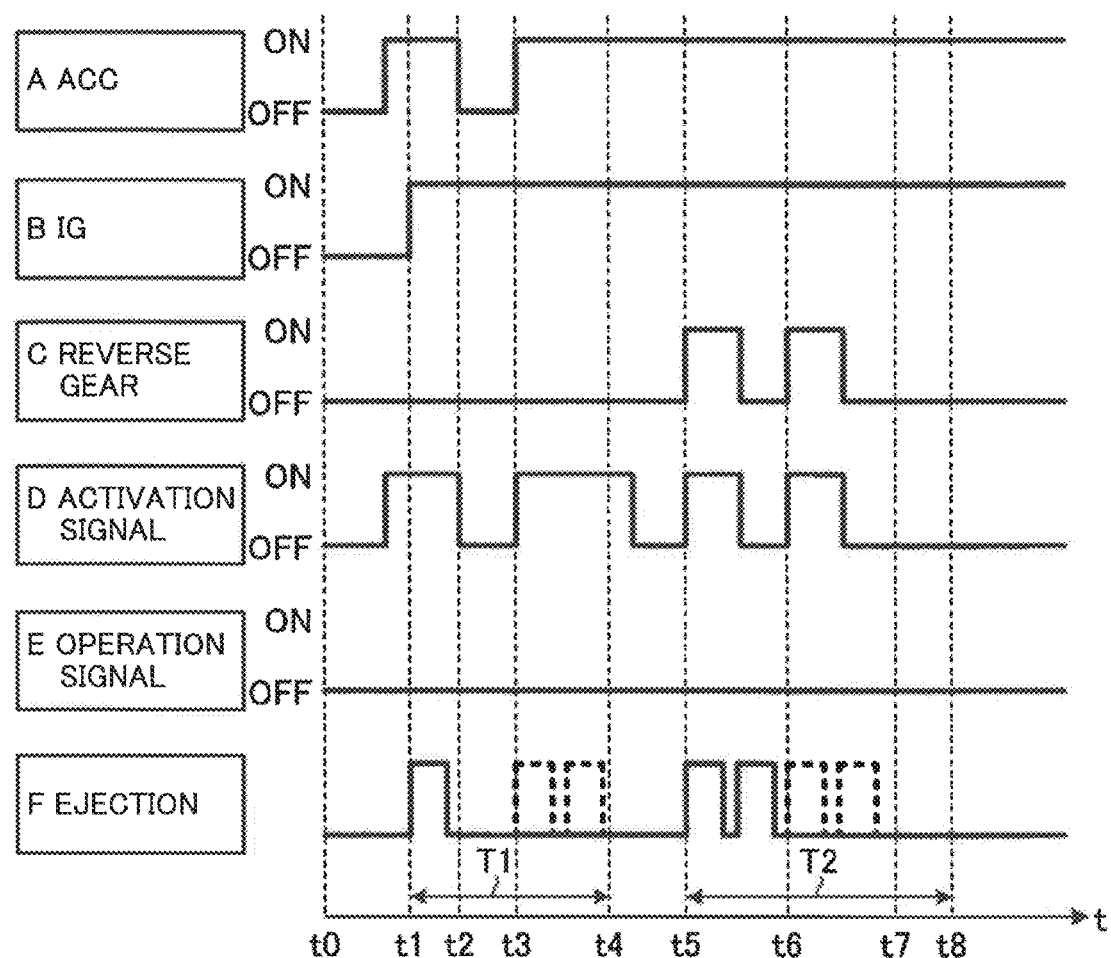
FIG. 8 illustrates a concrete example of a number of times of ejection with time.

During this time period (from a time point t0 to the time point t3), as shown by D in FIG. 8, the activation signal switches between ON and OFF in conjunction with a change of the ACC power to the ON state or the OFF state. The activation signal during this time period is a signal associated with the activation of the AVN.

Moreover, the time period from the time point t2 to the time point t3 during which the ACC power is OFF is approximately three seconds. Thus, if the gas is ejected once at a time point t1 and then twice at the time point t3, the gas is ejected three times in total during the short time period.

Therefore, the control portion 120 sets a timer at the time point t1 at which the gas is ejected the number of times for the initial ejection (once), and the control portion 120 also sets, for the activation signal detected during a first time period T1 (e.g., 10 seconds), a number of times of ejection less than the number of times for the initial ejection.

In this embodiment, since the number of times for the initial ejection is once (one), the number of times of ejection for the activation signal detected at the time point t3 in the first time period T1 is zero. In other words, the control portion 120 does not eject the gas from the compressor 10 at the time point t3.

Thus, it is possible for the control portion 120 to prevent the unnecessary ejection of the gas by the compressor 10. In other words, it is possible for the control portion 120 to set the proper number of times of ejection.

Then, as shown by C in FIG. 8, when the reverse gear is changed to the ON state (at a time point t5), the activation signal is turned on as shown by D in FIG. 8. The activation signal indicates a backward movement of the vehicle 50.

Therefore, as shown by F in FIG. 8, the control portion 120 controls the compressor 10, at the time point t5, to eject the gas the predetermined number of times (twice) based on the activation signal. At this time, the control portion 120 sets the timer and controls the compressor 10 to eject the gas the number of times less than the previous number of times based on the activation signal detected in the second time period 12.

C and D in FIG. 8 show a case in which when the reverse gear and the activation signal are changed to the ON stage at a time point t6 in the second time period T2, the control portion 120 causes the gas to be ejected zero times less than the predetermined number of times (twice), i.e., the control portion 120 does not cause the gas to be ejected at the time point t6.

One example of such a case is parking to park the vehicle 50 by turning a steering wheel a plurality of times and by moving the vehicle 50 back and forth repeatedly. A travelling distance of the vehicle 50 is relatively small in such parking so that there is a low possibility that the camera C has an object newly on the lens of the camera C.

Therefore, after the gas is ejected at the time point t5 at which the parking is started, even if the ejection of the gas based on a subsequent activation signal is skipped, there is a high possibility that an image captured by the camera C is a clear image without an object.

As described above, it is possible for the control portion 120 to control the compressor 10 to eject the gas the proper number of times as necessary by controlling the number of times of the ejection in accordance with the amount of time elapsing between a detection of the activation signal and a next detection of the activation signal.

When the operation signal is detected while the activation signal is being detected, the control portion 120 may cause the compressor 10 to eject the gas based on the operation signal even during the first time period T1 and the second time period T2.

Figure 9:
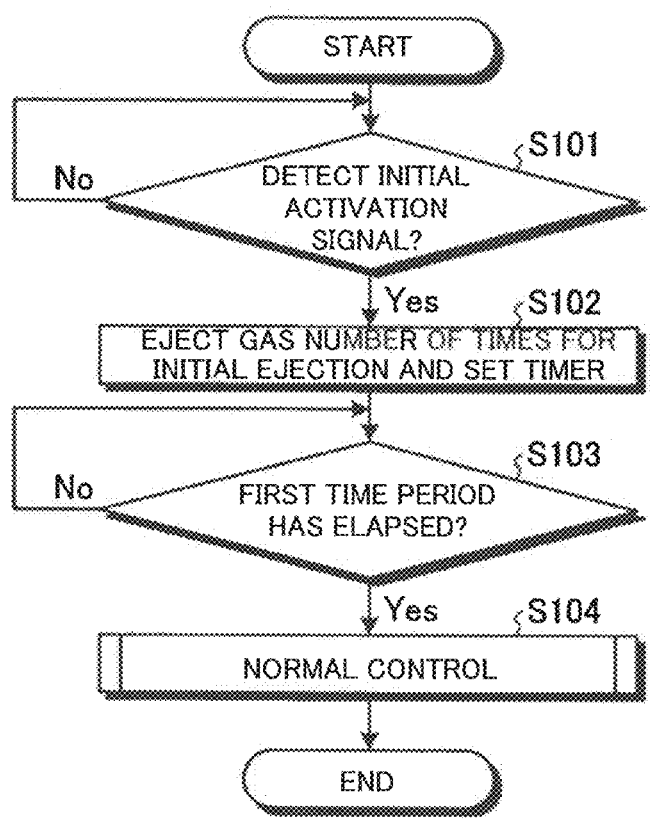
FIG. 9 is a flowchart (No. 1) illustrating process steps performed by the gas ejection apparatus.
Figure 10:
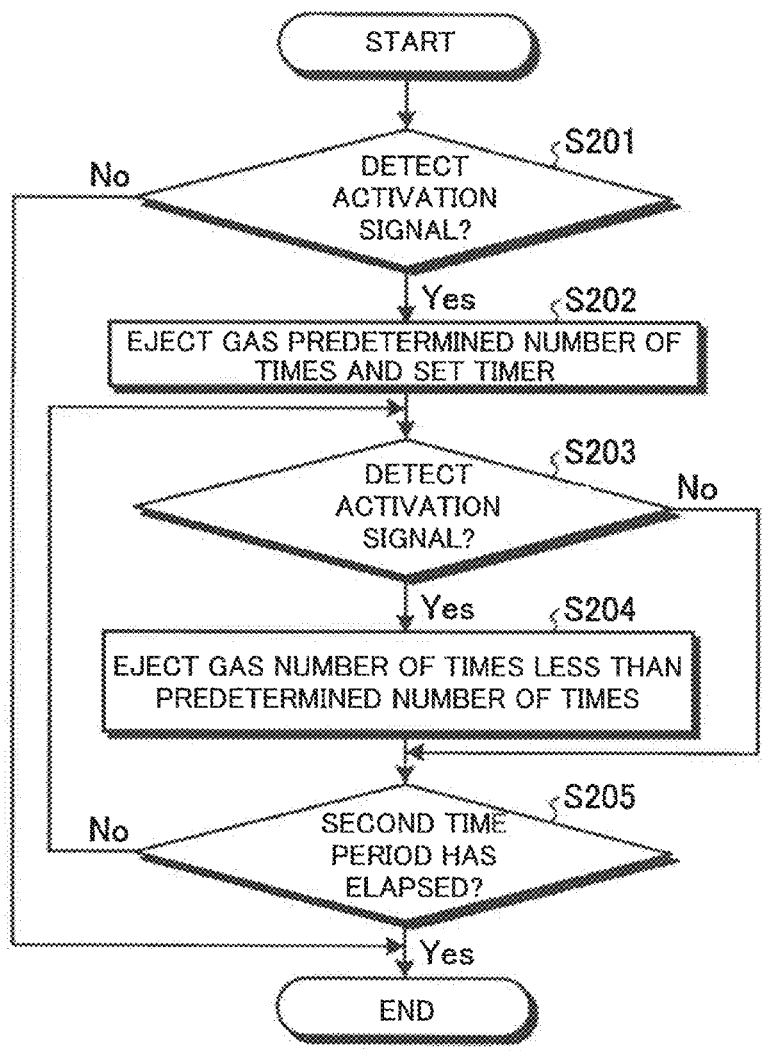
FIG. 10 is a flowchart (No. 2) illustrating process steps performed by the gas ejection apparatus.

Next, process steps performed by the controller 1 will be described with reference to FIGS. 9 and 10. FIGS. 9 and 10 are flowcharts illustrating the process steps performed by the controller 1.

First described will be process steps performed when the camera C is activated with reference to FIG. 9. As shown in FIG. 9, the detector 110 first determines whether or not the detector 110 has detected the initial activation signal that is inputted when the camera C is activated (a step S101).

In a case where the detector 110 has detected the initial activation signal (Yes in the step S101), the control portion 120 controls the compressor 10 to eject the gas the number of times for the initial ejection and sets the timer (a step S102).

On the other hand, in a case where the detector 110 has not detected the initial activation signal (No in the step S101), the detector 110 continues the step S101 until the detector 110 detects the initial activation signal.

Next, the control portion 120 determines whether or not the first time period T1 has elapsed (a step S103). Here, as described above, since the number of times of ejection for the initial ejection is one, the activation signal detected in the first time period T1 is deemed invalid.

In a case where the first time period T1 has not elapsed (No in the step S103), the control portion 120 continues the step S103 until the first time period T1 elapses.

On the other hand, in a case where the first time period T1 has elapsed (Yes in the step S103), the control portion 120 changes the mode of controlling the compressor 10 to the normal control (a step S104), and ends the process. The normal control will be described later in detail with reference to FIG. 10.

Next described with reference to FIG. 10 will be process steps performed by the controller 1 in the normal control after activation of the camera C is completed. The process described below corresponds to the step S104 in FIG. 9.

As shown in FIG. 10, the detector 110 first determines whether or not the detector 110 has detected the activation signal in the normal control (a step S201). In a case where the detector 110 has not detected the activation signal (No in the step S201), the controller 1 ends the process.

On the other hand, in a case where the detector 110 has detected the activation signal (Yes in the step S201), the control portion 120 controls the compressor 10 to eject the gas the predetermined number of times based on the activation signal, and sets the timer (a step S202). Next, the control portion 120 determines whether or not the detector 110 has detected the activation signal (a step S203).

In a case where the detector 110 has detected the activation signal (Yes in the step S203), the control portion 120 controls the compressor 10 to eject the gas a number of times less than the predetermined number of times (a step S204).

Next, the control portion 120 determines whether or not the second time period T2 has elapsed (a step S205). In a case where the second time period T2 has elapsed (Yes in the step S205), the control portion 120 ends the process.

On the other hand, in a case where the second time period T2 has not elapsed (No in the step S205), the control portion 120 continues the process from the step S203. Moreover, in a case where the activation signal has not detected in the step S203 (No in the step S203), the control portion 120 skips the step S204 and moves to the step S205.

As described above, the gas ejection apparatus 100 of this embodiment is an apparatus that ejects gas by use of the compressor 10 that compresses the gas. The gas ejection apparatus 100 includes the detector 110 and the control portion 120. The detector 110 detects a signal relating to the camera C (an example of gas ejection target devices). The control portion 120 controls the compressor 10 so as to change a number of times of ejection according to the amount of time elapsing between the time point at which the signal is detected by the detector 110 and the time point at which the next signal is detected. Thus, the gas ejection apparatus 100 of this embodiment sets a proper number of times of gas ejection.

The foregoing embodiment describes the case in which the activation signal relating to the camera C as a signal relating to a gas ejection target device is detected. However, the present invention is not limited to the case. In other words, the signal may be a signal indicating that an image captured by the camera C is displayed on the display.

Moreover, in a case where the image captured by the camera C is used for sensing, such as a white line detection and an obstacle detection, conducted by the vehicle 50, the signal may be a signal indicating that the white line detection or the obstacle detection starts. Moreover, the signal may be a signal indicating that a water drop, dirt or the like is on the lens C1 of the camera C.

Moreover, the foregoing embodiment describes the case in which the control portion 120 controls the compressor 10 to eject the gas less times or not to eject the gas in accordance with the elapsing time. However, the present invention is not limited to the case. In other words, the control portion 120 may control the compressor 10 to eject the gas more times as the elapsing time is longer.

In other words, it is possible for the control portion 120 to more surely supply a clear image by increasing the number of times of gas ejection when there is a high possibility of an object on the lens of the camera C because the elapsing time is long.

Further, the foregoing embodiment describes the case in which the gas ejection target device is the camera C mounted on the vehicle 50. However, the gas ejection target device is not limited to the camera C. In other words, the gas ejection target device may be another device, for example, a security camera installed on a street light.

The foregoing embodiment describes the case in which the compressor 10 is caused to eject the gas in response to the activation signal inputted to the camera C in conjunction with the reverse gear. However, the present invention is not limited to the case.

In other words, the gas ejection apparatus 100 may control the compressor 10 based on the signal relating to the backward movement of the vehicle 50. The signal may be, for example, a reverse signal or another signal indicative of the backward movement of the vehicle 50.

In short, it is possible for the gas ejection apparatus 100 to control the compressor 10 to eject the gas when the vehicle 50 moves backward, regardless of the signal relating to the camera C. In that case, when the vehicle 50 intermittently repeats to move backward within the predetermined time period, it is possible to reduce the ejection of the gas by the compressor 10.

In other words, in a case where a signal relating to the backward movement of the vehicle 50 is intermittently detected, the gas ejection apparatus 100 recognizes that the vehicle 50 is being parked by turning the steering wheel many times. Thus, it is possible to control the compressor 10 to prevent an unnecessary ejection of the gas.

The foregoing embodiment describes the case in which the controller 1 is mounted in the gas ejection apparatus 100. However, a configuration is not limited to the case. In other words, the controller 1 may be provided outside the gas ejection apparatus 100. In other words, the controller 1 may be provided in a vicinity of a driver seat or the like.

The foregoing embodiment describes the case in which the compressor 10 has the rotary gas compression mechanism. However, the compressor 10 may have a cylinder gas compression mechanism. Further, the foregoing embodiment describes the case in which the controller 1 directly detects the activation signal for the gas ejection target device. However, the controller 1 may indirectly detect a signal indicative of the activation for the gas ejection target device.

While the invention has been shown and described in detail, the foregoing description is in all aspects illustrative and not restrictive. It is therefore understood that numerous other modifications and variations can be devised without departing from the scope of the invention.

What is claimed is:

1. A gas ejection apparatus that is configured to eject gas from a gas compressor toward an ejection target device, the gas ejection apparatus comprising:
   a detector that is configured to detect a gas ejection apparatus activation signal relating to the ejection target device; and
   a microcomputer that is configured to control the gas compressor to change a number of times of ejection of the gas that is ejected from the gas compressor toward the ejection target device depending on an amount of time elapsing between each detection of the activation signal by the detector and each next detection of the activation signal by the detector during a predetermined time period,
   wherein the microcomputer is configured to change the number of times of ejection of the gas from the gas compressor without stopping all ejections of the gas from the compressor that result from detection of the activation signal relating to the ejection target device.

2. A gas ejection apparatus that is configured to eject gas from a gas compressor toward an ejection target device, the gas ejection apparatus comprising:
   a detector that is configured to detect a gas ejection apparatus activation signal relating to the ejection target device; and
   a microcomputer that controls is configured to control the compressor to change a number of times of ejection of the gas that is ejected from the gas compressor toward the ejection target device depending on an amount of time elapsing between each detection of the activation signal by the detector and each next detection of the activation signal by the detector during a predetermined time period,
   wherein the microcomputer is configured such that the change in the number of times of ejection of the gas from the gas compressor, that result from detection of the activation signal relating to the ejection target device, is to a number other than zero.

3. A gas ejection apparatus that is configured to eject gas from a gas compressor toward an ejection target device, the gas ejection apparatus comprising:
   a detector that is configured to detect a gas ejection apparatus activation signal relating to the ejection target device; and
   a microcomputer that is configured to control the gas compressor to change a number of times of ejection of the gas that is ejected from the gas compressor toward the ejection target device depending on an amount of time elapsing between each detection of the activation signal by the detector and each next detection of the activation signal by the detector,
   wherein the microcomputer is configured such that the number of times of ejection based on the next detection of the activation signal is greater than the number of times of ejection based on the detection of the activation signal.

4. The gas ejection apparatus according to claim 3, wherein the microcomputer is configured such that the number of ejections of gas from the gas compressor based on the detection of the activation signal is one and the number of ejections of gas from the gas compressor based on the next detection of the activation signal is two or more.

* * * * *